United States Patent [19]

Taylor

[11] Patent Number: 4,838,793
[45] Date of Patent: Jun. 13, 1989

[54] ACTIVITY DISPLAY ARTICLE WITH REMOVABLE MANIPULATIVES

[76] Inventor: Cheryl J. Taylor, 520 Chapel Rd., Amelia, Ohio 45102

[21] Appl. No.: 253,628

[22] Filed: Oct. 5, 1988

[51] Int. Cl.$^4$ .............................................. G09B 1/08
[52] U.S. Cl. .................................... 434/168; 434/190; 434/430; 40/600
[58] Field of Search ............... 434/168, 190, 430, 428, 434/429; 40/600

[56] References Cited

U.S. PATENT DOCUMENTS

| | | | |
|---|---|---|---|
| 1,033,576 | 7/1912 | Garman . | |
| 2,946,137 | 7/1960 | Worth et al. | 434/178 |
| 3,156,056 | 11/1964 | Pribil | 434/430 X |
| 3,316,669 | 5/1967 | Nachbar | 434/429 X |
| 3,496,653 | 2/1970 | Wolfner et al. | 434/168 |
| 3,726,026 | 4/1973 | Borcherding | 434/430 |
| 4,045,897 | 9/1977 | Gates | 434/430 X |
| 4,702,700 | 10/1987 | Taylor | 434/168 |

Primary Examiner—William H. Grieb
Attorney, Agent, or Firm—Charles R. Wilson

[57] ABSTRACT

An activity display article is constructed to have multi-educational features especially useful for teaching basic skills to young children. The article comprises at least one activity sheet having visual objects printed thereon. A magnetic strip is mounted on a back side of the activity sheet for holding the paper sheet to a ferrous base surface. A set of manipulatives is used with the printed activity sheet. Magnetic means on the manipulatives permit a variety of educational uses, including word association and matching.

9 Claims, 1 Drawing Sheet

ACTIVITY DISPLAY ARTICLE WITH REMOVABLE MANIPULATIVES

This invention relates to activity display articles. More particularly, the invention relates to activity display articles that contain multi-educational features of young children.

BACKGROUND OF THE INVENTION

Several books for the purpose of teaching young children to read have been published. They have taken on various formats. Most books reflect the consensus of educators that repetition of words is a very important aspect of the learning process. To be effective, the repetition should not be a monotonous drill, but should be presented in such a way as to maintain the child's interest at a high level and encourage accuracy of perception. Books generously illustrated with pictures of boldly colored distinct objects are more likely to retain a child's interest than unillustrated books. Books replete with series of repetitious words and full of illustrations would seem to be optimum; in fact, most books used for teaching reading skills to children are so formatted.

Another aspect to the teaching process for improving reading skills utilizes word/object associations. For example, a word is printed on or directly next to a visual representation of that word. Such an association may be repeated several times throughout a book. U.S. Pat. Nos. 3,496,653 contains a disclosure of this type of book.

A common drawback with known books is that they are very limited in their use. For instance, a book may contain a series of stories where a small number of words are repeated several times. Such a book does provide a useful function, but has diminished usefulness once it has been read. Other available books based on the concept of word/object association suffer from the same limited usefulness.

Known learning aids such as posters, board games, etc. have the same inherent limitations as books. They are generally limited in their use because of their basic construction.

There is a need for a learning aid which provides a varied method of teaching reading skills based on generally accepted methods. Such an article would not be monotonous to the child. Additionally, the article would be capable of being used in a variety of learning exercises. Such a variety would make the article interesting and challenging to the child while giving the teacher/parent a choice of options tailored to fit a particular child's learning needs and degree of advancement. Any article of course, must be capable of mass production at a reasonable cost. In accord with the invention herein, an article has been developed which fulfills the objectives of teaching basic skills in a variety of ways.

SUMMARY OF THE INVENTION

An activity display article with multi educational-features comprises at least one printed activity sheet having a set of distinct visual objects printed on at least one side thereof. The activity sheet is characterized in having a magnetic strip permanently positioned on a backside for the purpose of holding said sheet to a ferrous base surface. It is further characterized in having a clear washable covering on at least the front side for easy marking removal. Small removable manipulatives with magnetic means are also provided. The manipulatives are shaped to match like and unlike visual objects on the activity sheet or are block-shaped with printed words which match the visual object or the same printed word on the printed activity sheet. Magnetic means associated with the manipulatives permit a variety of learning processes using the manipulatives and the activity sheet when held to a ferrous base surface.

DETAILED DESCRIPTION OF THE INVENTION

The paragraphs which follow describe the activity display article of this invention with particular reference to the drawings. Some of the many varied educational features permitted by the article's unique construction are also described.

Figure 1:
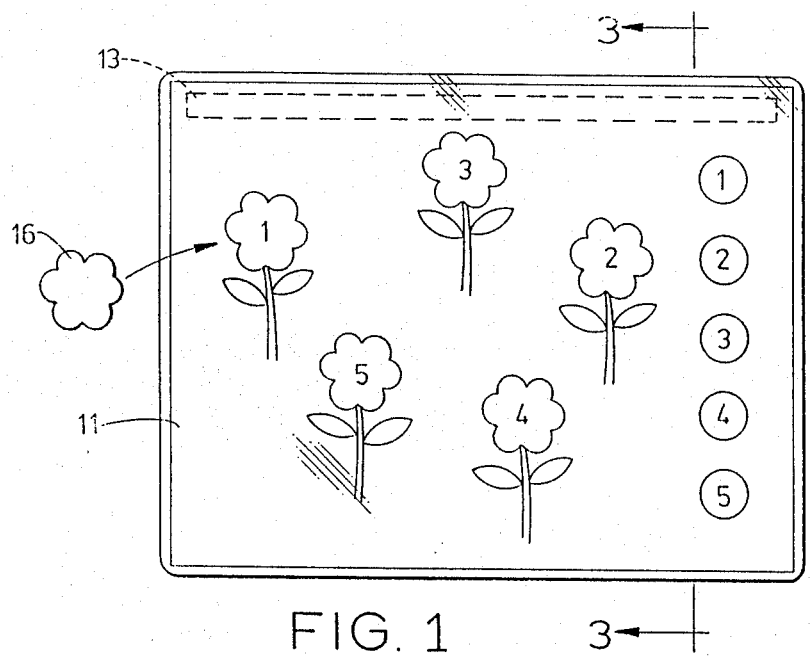
FIG. 1 is a front view of an activity display article of this invention.
Figure 2:
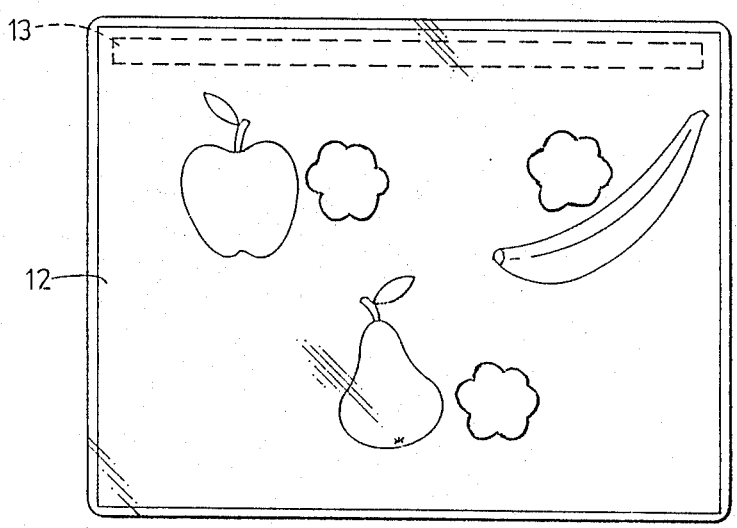
FIG. 2 is a back view of an activity sheet of the display article of FIG. 1.
Figure 3:
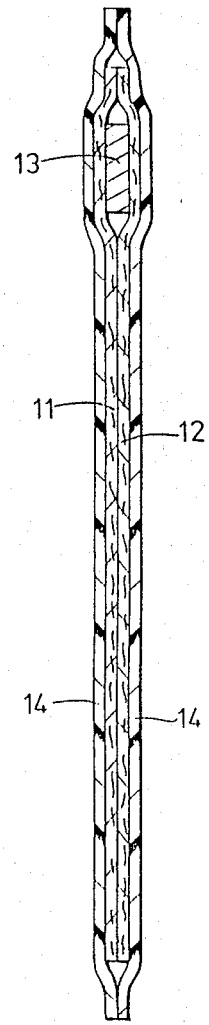
FIG. 3 is a sectional view taken along line 3—3 of FIG. 1.

With reference to FIG. 1, there is shown an activity display article comprised of two activity sheets, each made of paper. As evident, a first activity sheet 11 has a set of distinct visual objects printed on its front surface. The second activity sheet 12, or back side of the article, as seen in FIG. 2. also has a set of visual objects printed thereon. The use of two different activity sheets as a part of the activity article increases its versatility and this is preferred. However, a single activity sheet with printing on only one side is feasible. The particular objects printed on a particular activity sheet can be varied based primarily on aesthetic and child preference reasons.

A thin magnetic strip 13 is positioned between the two activity sheets. The purpose of the magnetic strip is to provide a convenient means by which the printed activity sheets can be held to a work surface. For example, a long vertical surface such as a metal backed erasable chalkboard or a refrigerator door can be used to hold the activity sheets while the parent/teacher is free to move about, point, etc. Preferably, the magnetic strip is positioned near one edge of the activity sheet so as to not interfere with its use. Such strips are commercially available. An adhesive is used to hold the magnetic strip to each sheet. Alternatively, a series of magnetic strips of virtually any dimension can be positioned and used to hold the activity sheets to a ferrous surface.

The printed activity sheet is further characterized by having a thin clear washable covering 14 over at least that side of the sheet with the printed visual objects. One of the many uses of the activity display article involves marking the visual objects with crayon, marker, etc. The washable covering facilitates removal of any markings, thereby permitting the article to be repeatedly used. A preferred covering in a thin plastic sheet laminated to the outside surface of each activity sheet so as to substantially encase the sheets. Alternatively, a clear non-toxic varnish can be printed or spray applied to the sheets.

A set of removable manipulatives is provided for use with the activity article. Such manipulatives are normally associated with a particular activity sheet and are intended for use with that sheet. For the sake of clarity, only one manipulative, labeled 16, is shown in FIG. 1. The set to be used with the activity sheet of FIG. 1 would actually comprise five manipulatives. Each manipulative would preferably be a different color.

Figure 4:
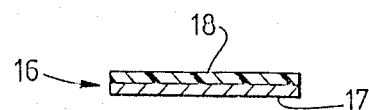
FIG. 4 is a side view in section of a manipulative used with the display article of FIG. 1.

The manipulative has magnetic means either positioned within it or added to its back surface. As shown in FIG. 4. the manipulative 16 has a vinyl covering 18 with a flexible magnetic means 17 adhered to its bottom. Other polymeric materials of a flexible or inflexible nature can be used to cover the magnetic means 17. Paper and fabric coverings can as well be used. It is preferred that the manipulative be flexible. In addition, it is preferred that the face of the manipulative be provided with a washable covering of a nature used with the activity sheets.

The size of each manipulative is large enough so as not to pose a health hazard from accidental swallowing, but not so large it will be unable to come within the confines of a particular paper sheet. Generally, each manipulative ranges in width and length between about one inch to about four inches, preferably between about one and one-half inches to about three inches. It can take on many different shapes, including a like shape to match the printed visual object on the activity sheet, an unlike shape and block-shaped with appropriate word or words printed on it. The particular shape and/or word will depend on the particular educational feature desired. An appropriate word can optionally be printed on the back of a manipulative as a part of one of the educational features built into the activity display article. The particular means used for holding a manipulative to the activity sheet, i.e. the magnetic means allows this feature.

As should be apparent the particular polarity of any magnetic means much be chosen with regard to the polarity of the magnetic means with which it will be associated. Preferably the magnetic means used with the manipulatives have a polarity opposite that of the magnetic means on which the activity sheet is placed during use. As well known, however, any ferrous metal is capable of having a magnetic force artificially imparted to it; accordingly, a ferrous metal can be used which will become magnetized at least temporarily by magnetic means closely associated with it.

Preferably, the activity display article is packaged with three to six units and one set of manipulatives. Two activity sheets placed back to back as depicted in FIGS. 1 and 2 represents one unit. The single set of manipulatives is used with all three to six units, i.e six to twelve activity sheets. A most preferred display article comprises three uints, each unit having two activity sheets.

A wide variety of educational features can be built into the article based on the above discussed physical characteristics of the activity display article. Among the many varied educational exercises a child can do because of the construction of the activity article include: the child can point to a certain object upon request; the child can be asked to identify colors on the activity sheet; the child can count objects on the activity sheet while touching each object; the child can place a manipulative on an appropriate object on the activity sheet as the teacher/parent reads a companion book; the child can learn addition by counting the manipulatives; word/object associations can be learned by the child by placing word manipulatives on or below corresponding printed words on the activity sheet; the child can learn size concepts by appropriately illustrated visual objects on the sheet; the child can be taught shape recognition by appropriately shaped visual objects and manipulatives; the child can learn to match like objects; the child can match number words to correct numerals by proper selection of manipulatives; the child can match printed words to visual objects; the child can read to the teacher based on the words and visual objects on the activity sheet; and the child can properly order words in a sentence either with or without the aid of printed words on the activity sheet.

It should be apparent that while the present invention has been described with reference to the drawings, obvious embodiments and variations not described are within the scope of the invention.

What is claimed is:

1. A children's activity display article for use in conjunction with a ferrous base surface wherein the article has multi-educational features for self-learning and directed learning, said article comprised of:
   (a) two activity sheets each having a set of distinct visual objects printed on a front side, said activity sheets placed back to back with a magnetic strip positioned between the sheets for the purpose of holding said sheets in a fixed position with the ferrous base surface during use and further having a clear washable covering on each of the front sides for easy removal of any markings imparted thereon as a part of the learning use; and
   (b) a set of small manipulatives for use with the activity sheets, said manipulatives being shaped to fit within the outlines of the printed visual objects and having magnetic means for attraction to the ferrous base surface on which the activity sheets are positioned during use.

2. The children's activity display article of claim 1 wherein the magnetic means associated with each manipulative is secured to the back surface of said manipulative.

3. The children's activity display article of claim 2 wherein the removable manipulatives have a width and length ranging from about one inch to about four inches.

4. The children's activity display article of claim 3 wherein the manipulatives are each flexible.

5. The children's activity display article of claim 4 wherein each manipulative has a washable covering on a face surface.

6. The children's activity display article of claim 1 wherein each of the removable manipulatives has wording on its backside for use in conjunction with the visual objects on the activity sheet.

7. The children's activity display article of claim 3 wherein the magnetic strip is positioned along an edge of the activity sheets.

8. The children's activity display article of claim 7 wherein the magnetic strip is positioned along a top edge of the activity sheets.

9. The children's activity display article of claim 1 wherein the washable covering on the activity sheets is a clear plastic laminate which encases the sheets.

* * * * *